United States Patent [19]

Koros et al.

[11] Patent Number: 4,755,192
[45] Date of Patent: Jul. 5, 1988

[54] PROCESSES TO CONDITION GAS PERMEABLE MEMBRANES

[75] Inventors: William J. Koros; Susan M. Jordan; Greg K. Fleming, all of Austin, Tex.

[73] Assignee: Board of Regents, The University of Texas System, Austin, Tex.

[21] Appl. No.: 38,392

[22] Filed: Apr. 15, 1987

[51] Int. Cl.$^4$ .............................................. B01D 53/22
[52] U.S. Cl. .......................................... 55/16; 55/68; 55/158; 210/640; 525/383; 528/498
[58] Field of Search ............................... 55/16, 68, 158; 210/640; 521/51; 525/383; 528/483, 498

[56] References Cited

U.S. PATENT DOCUMENTS

| | | | |
|---|---|---|---|
| Re. 30,351 | 7/1980 | Hoehn et al. | 55/158 X |
| 661,177 | 11/1900 | Hill, Jr. | 525/383 |
| 661,178 | 11/1900 | Hill, Jr. | 525/383 X |
| 795,026 | 7/1905 | Comstock | 525/383 X |
| 2,095,673 | 10/1937 | Minor | 525/383 |
| 2,264,509 | 12/1941 | Cooper | 528/483 X |
| 2,944,047 | 7/1960 | Schutze et al. | 528/483 X |
| 3,075,952 | 1/1963 | Coover, Jr. et al. | 528/483 X |
| 3,228,876 | 1/1966 | Mahon | 210/22 |
| 3,228,877 | 1/1966 | Mahon | 210/22 |
| 3,367,504 | 2/1968 | Westmorland | 210/321 |
| 3,387,583 | 6/1968 | Kuether | 115/0.5 |
| 3,417,870 | 12/1968 | Bray | 210/321 |
| 3,526,001 | 8/1970 | Smith | 210/23 |
| 3,536,612 | 10/1970 | Kopecek et al. | 210/23 |
| 3,822,202 | 7/1974 | Hoehn | 210/23 |
| 3,928,294 | 12/1975 | Carwford et al. | 55/16 X |
| 4,206,293 | 6/1980 | Kruse | 525/383 X |
| 4,230,473 | 10/1980 | Miller | 65/3 |
| 4,398,926 | 8/1983 | Doshi | 55/16 |
| 4,428,776 | 1/1984 | Li | 106/122 |
| 4,472,175 | 9/1984 | Malon et al. | 55/158 X |
| 4,516,580 | 5/1985 | Polanyi | 128/632 |
| 4,521,224 | 6/1985 | Li | 55/16 |
| 4,527,999 | 7/1985 | Lee | 55/158 X |
| 4,575,385 | 3/1986 | Brooks et al. | 55/158 |
| 4,614,524 | 9/1986 | Kraus | 55/16 |
| 4,659,343 | 4/1987 | Kelly | 55/16 |
| 4,673,418 | 6/1987 | Peinemann | 55/158 |

FOREIGN PATENT DOCUMENTS

| | | | |
|---|---|---|---|
| 6341 | 1/1980 | European Pat. Off. | 528/483 |
| 183314 | 6/1986 | European Pat. Off. | 528/483 |
| 9368 | 4/1968 | Japan | 528/483 |
| 216603 | 12/1984 | Japan | 55/158 |

OTHER PUBLICATIONS

Fleming et al., (1986), *Macromolecules*, 19:2285.
Koros et al., (1986), "Gas Separation Using Membranes," Separations Research Program, Apr. 15-16, 1984.
"Desalination of Seawater by Reverse Osmosis," Ed. J. Scott, Noyes Data Corporation, 1981.
Berens et al., (1979), *Jrnl. Pol. Science*, 17:1757.
O'Brien et al., (1986), *Jrnl. Memb. Sci.*, 29:229.
Bollinger et al., (1982), *Chem. Eng. Prog.*, 78:27.
Schell et al., (1982), *Chem. Eng. Prog.*, 78:33.
Gardner et al., (1977), *Chem. Eng. Prog.*, 73:76.
Antonson et al., (1977), *Ind. Eng. Chem. Proc. Des.*, 16:463.
Koros et al., (1977), *Jrnl. Membr. Sci.*, 2:165.
Kammermeyer (1957), *Ind. Eng. Chem.*, 49:1685.

*Primary Examiner*—Robert Spitzer
*Attorney, Agent, or Firm*—Arnold, White & Durkee

[57] ABSTRACT

Glassy-type gas separating membranes are conditioned to a state of enhanced permeability through controlled sorption of a selected conditioning gas such as $CO_2$. Membranes are swelled to a state of plasticity without being rubberized and maintained in this state to allow their permeabilities to settle to a new, higher steady-state value. Upon depressurization, conditioned membranes exhibit enhanced permeability over untreated membranes, without serious loss of permselectivity. Membranes so conditioned must be maintained with a minimum sorption level of a conditioning or maintaining gas pending use to retain their improved characteristics.

31 Claims, 10 Drawing Sheets

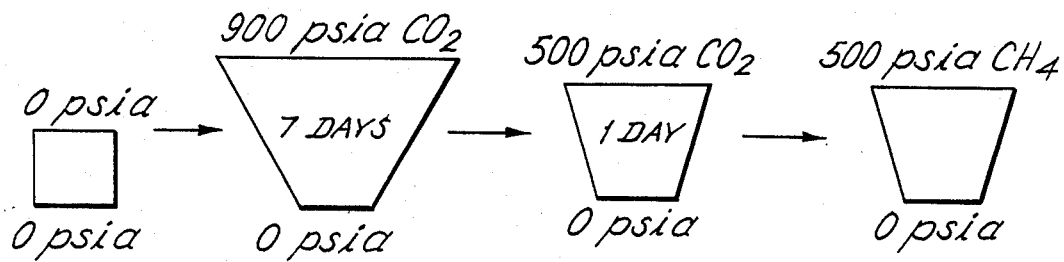
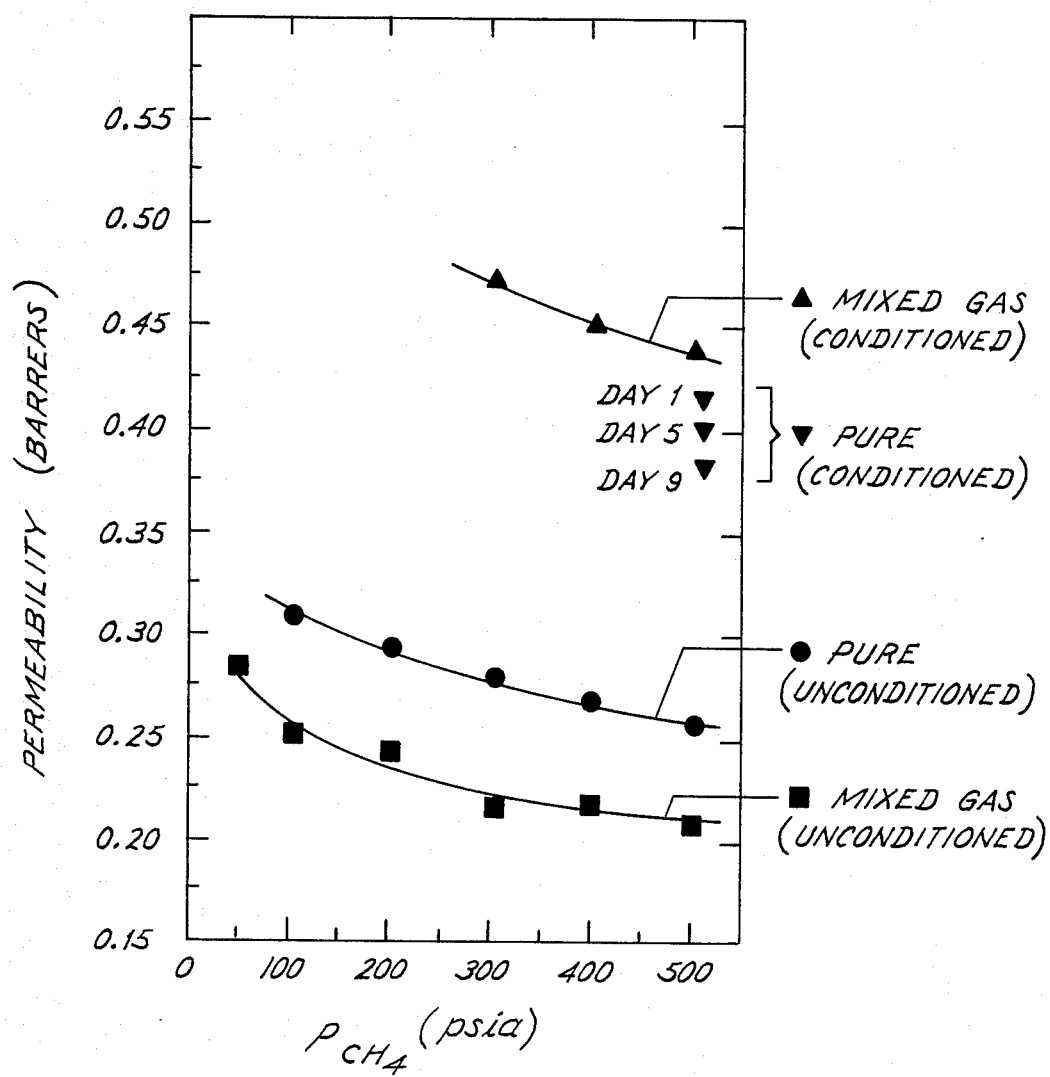
Fig. 2

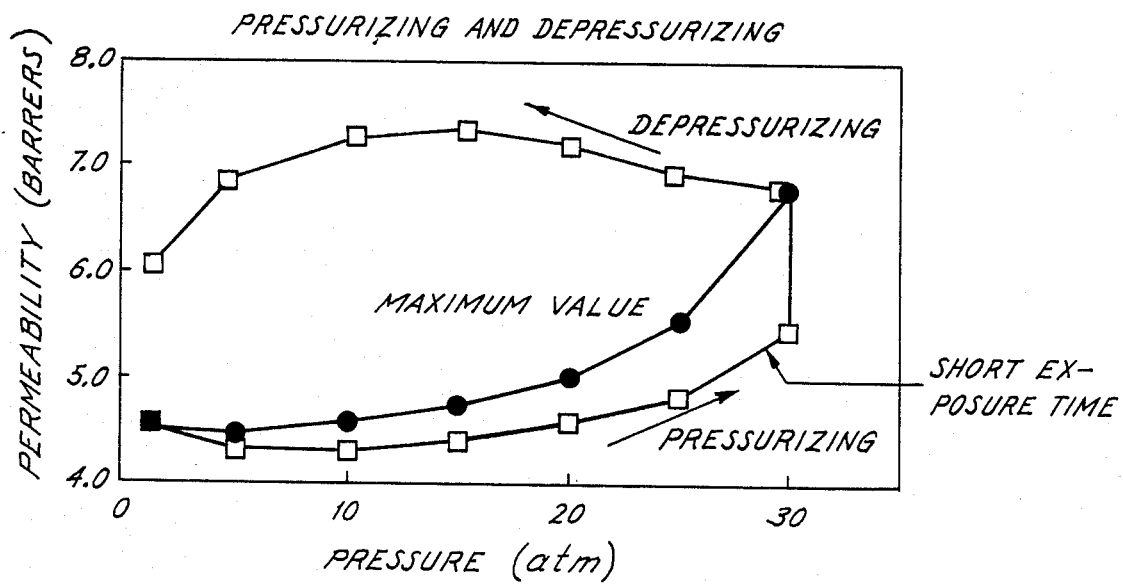
Fig. 7
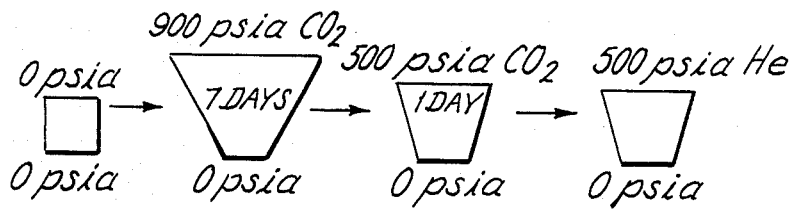
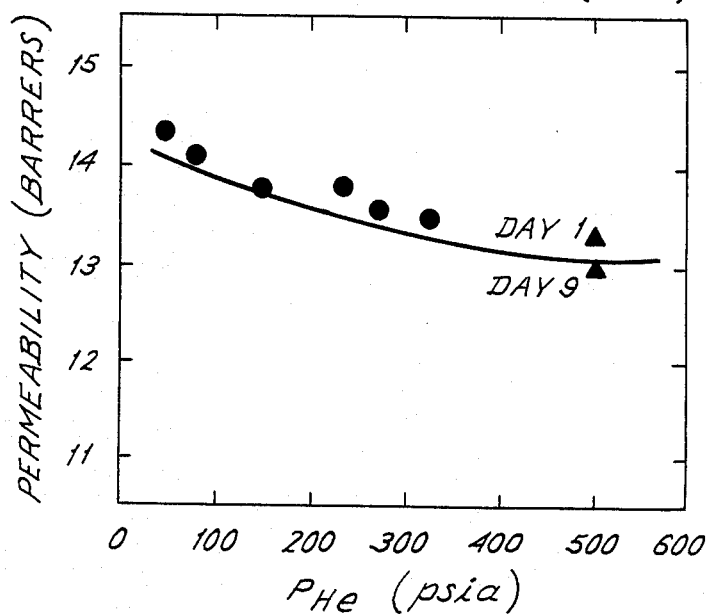
Fig. 8

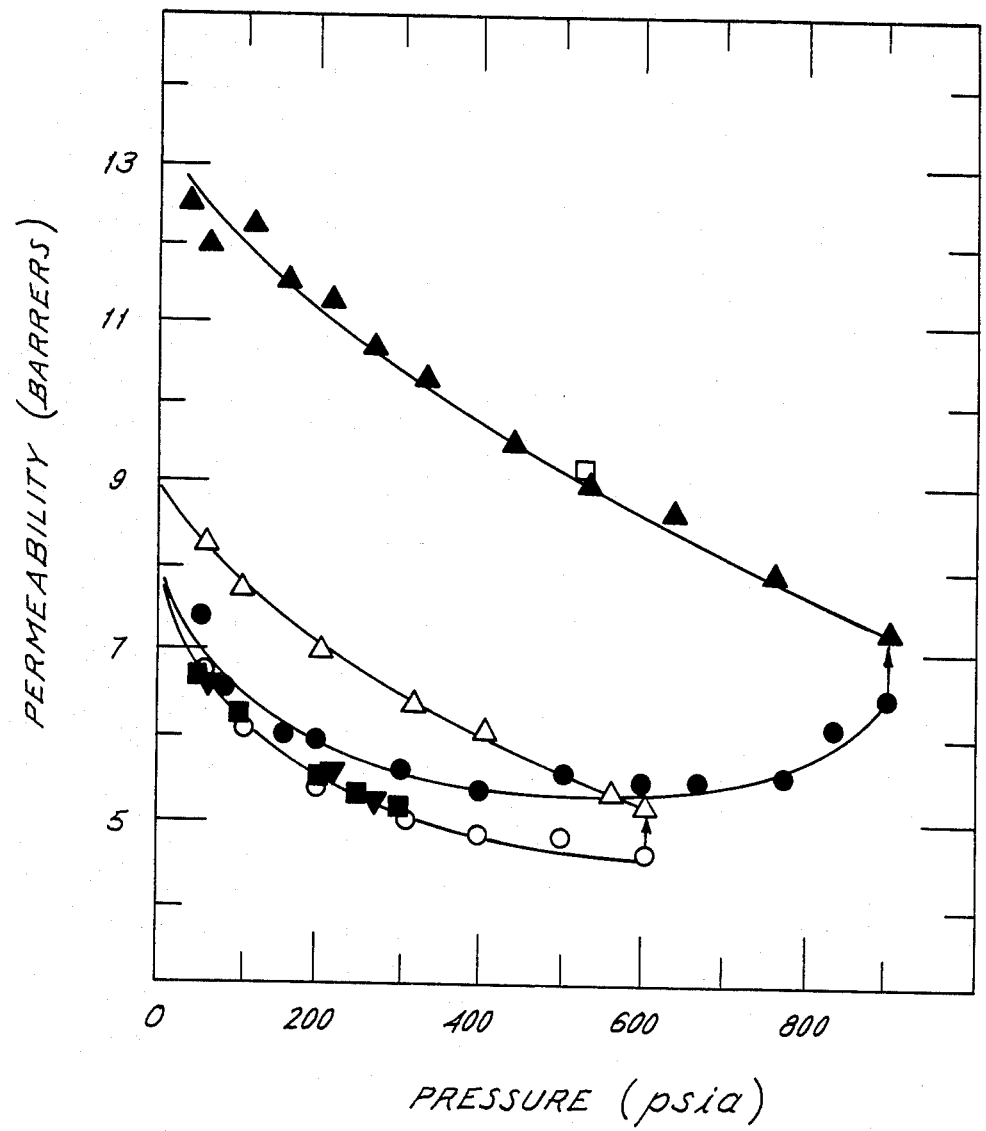

PROCESSES TO CONDITION GAS PERMEABLE MEMBRANES

BACKGROUND OF THE INVENTION

The Government may own certain rights in the present invention pursuant to NSF grant CPE-8319285 and CBT-8516148.

1. Field of the Invention

The present invention relates to gas permeable membranes. More particularly, the invention relates to novel processes for conditioning such membranes of the glassy polymeric type to markedly improve their permeability without seriously reducing their selectivity.

2. Description of the Related Art

The energy efficiency and simplicity of membrane separation devices make them extremely attractive for solution of fluid-phase separation problems. The ability of ideal membrane processes to selectively pass one component in a mixture, while rejecting others in a continuous steady-state manner, defines the perfect separation device. A substantial literature related to gas separation indicates, however, that numerous factors must be considered in achieving a commercially successful membrane-based process. Nevertheless, some membrane separating devices have proved to be strongly competitive with—if not superior to—more traditional chemical engineering separation approaches, for certain applications at least (see, e.g., Gardner et al. (1977), *Chem. Eng. Prog.*, 73:76; Bollinger et al. (1982), *Chem. Eng. Prog.*, 78:27; Schell et al. (1982), *Chem. Eng. Prog.*, 78:33).

Two serious limitations faced by early gas separation techniques employing membranes were their relatively low selectivities and low permeation fluxes. The low flux problem arose because membranes had to be thick, generally at least one mil, to avoid pinholes, which destroyed selectivity as a result of almost indiscriminate passage of feed components.

Generally speaking, two broad classes of membranes have proved useful in gas separating technology, membranes composed of either glassy-type or rubbery-type polymers. For example, the discovery of the extraordinarily high permeability of silicone polymers spurred a renewed interest in gas separation aimed at $O_2/N_2$ separation from air (see, e.g. Kammermeyer (1957), *Ind. Eng. Chem.*, 49:1685). Unfortunately, their $O_2/N_2$ selectivity is rather low. Moreover, rubber membranes require very large membrane areas and are not generally competitive with cryogenic processes. Typical rubbery polymers used in membrane technology include silicone rubber, natural rubber and polychloroprene (Neoprene ®).

Glassy-type polymers have proven to be an effective alternative to the rubbery polymers in a number of membrane configurations, for example, in hollow fiber configuration (see, e.g., Antonson et al. (1977), *Ind. Eng. Chem. Proc. Des.*, 16:463), and spiral wound configuration (see, e.g., Schell et al. (1982) *Chem. Eng. Prog.*, 78:33 ). In contrast to the rubbery polymeric membranes, glassy-type membranes, in general, demonstrate much higher and broader-spectrum gas selectivities. Unfortunately, the glassy-type polymers on the average exhibit much lower permeability. This has necessitated the development of various configurations, and membrane structures, which allow for the use of very thin membrane cross-section between the feed gas and the permeate, and provide large membrane surface areas. Hollow fibers are one such example of devices providing a very high membrane surface area relative to the size of the device.

Hollow fiber technology has developed out of early work in the 1960's demonstrating their potential versatility in the fields of gas separation, artificial kidney's and desalination. Hollow fiber membranes have been mentioned in a number of early patents, for example, U.S. Pat. Nos. 3,228,877; 3,228,876; and 3,526,001. Because of the problem of low permeability, most of the subsequent design modifications have centered on structures to increase surface area/or improve membrane structure, e.g., membrane formation development to provide thinner, hence more permeable membranes. For example, the so-called spiral-wound module currently used by Separex, Grace and FilmTech dates back to 1968, when a reverse osmosis apparatus was described in a series of U.S. Pat. Nos. 3,367,504; 3,417,870 and 3,387,583. In general, the spiral-wound concept consists of a porous backing material, e.g., Dacron ® felt, placed between the two halves of a folded continuous membrane, separated by a grid backing.

However, as techniques have improved for the utilization of increasingly thinner membranes, the requirement that those membranes be "essentially pore free" have become more stringent. As will be appreciated, even a pore of 10A to 50A can be devastating to permselectivities which must discriminate between gas molecules with characteristic dimensions of 3A to 5A. U.S. Pat. No. 4,230,473 addresses this problem through the post treatment of asymmetric fibers with a "stop leak" material such as silicone rubber. Membranes embodying this composite membrane approach are currently marketed by Permea under the trademark Prism ®.

Alternate approachs to composite membrane development, as embodied by reverse osmosis membranes of Film Tech and other companies, have resulted in membranes which are basically mirror-images to the Permea devices. In these cases, the membrane support is highly porous, and a thin, selective coating is formed on the porous support by interfacial polymerization. Other approaches to improve permeability and selectivity have been directed toward new polymer development (see, e.g., U.S. Pat. No. 3,822,202 and U.S. Pat. Reissue No. 30,351 which described tailored aromatic polyamides).

A further approach taken to improve the permeability of glassy-type membranes without sacrificing their selectivity, has been to treat the membrane itself with a permeation modifier. Such an approach has been described in U.S. Pat. No. 4,575,385. There, membranes generally of the glassy type are treated with a solvent composed of one or more of various benzene derivatives for a short period of time, and the solvent allowed to evaporate. While this technique has demonstrated moderate improvements in permeability for some polymers, its use can be expensive, messy and inconsistent at times. Also, migration of the additive is a potential problem with this method.

Accordingly, the ideal process for enhancing membrane permeability would be one that is inexpensive, applicable to a broad range of membrane materials, provide consistently improved membranes without seriously reducing their selectivity and be easy to perform. Unfortunately, no such processes have been previously available. The advent of processes for treating membranes to improve their permeability which have one or more of the foregoing advantages would provide the gas separation art with important alternatives to current methods and devices.

SUMMARY OF THE INVENTION

The present invention addresses at least some of these and other disadvantages of the art by providing a method for improving the permeability of glassy-type polymeric membranes that is simple, fool-proof and applicable to the entire class of such membranes. The process in its most general scope, is a process for conditioning glassy-type polymeric membranes to improve the flux of a gas penetrant therethrough. In this regard, a penetrant is defined as any molecule, or mixture of molecules, capable of selectively sorbing (i.e., dissolving) into glassy type membranes and diffusing across the membrane from a higher pressure, or "upstream," side to a relatively lower pressure, or "downstream" side.

In the case of glassy polymers used for gas separation or gas permeation, it is found that the upper limit of their ability to selectively permeate gases is bounded by a change in the molecular motions of the polymer at very high penetrant concentrations. This change in molecular motions is termed the transition from a "glassy-state" to a "rubbery-state". This transition can be characterized in physical terms by changes in modulus and heat capacity, and more particularly by a loss in the ability of the rubbery material to precisely discriminate between permeating species.

A characteristic feature of the transition from a glassy-state to a rubbery-state induced by sorption of a high sorbing material is the appearance of an intermediate "plasticization" state where the polymer undergoes a progressive increase in permeability with a corresponding progressive loss in selectivity.

The present invention embodies the surprising discovery that when membranes of a glassy polymer type are sorbed or swelled to a plasticized state with a selected gas conditioning agent in a substantially pure form, and then partially desorbed, the membrane so treated will exhibit greatly enhanced permeability with very little loss of their original selectivity. The successful practice of the invention, though, hinges on a proper swelling of the membrane to a point where the membrane is "plasticized" without being "rubberized", maintaining the membrane in a plasticized state for a period of time sufficient to stabilize the gas flux characteristics of the membrane; and reducing the amount of dissolved penetrant from the stabilized membrane to a level that will still serve to maintain the membrane in such a stabilized condition state pending use.

The first step of the process therefore generally is defined in terms of dissolution or sorption of a gas conditioning agent within the membrane itself in a manner that will plasticize the membrane. In this regard it is observed that membrane permeability, upon the application of an increasing pressurization or sorption of for example, a selected conditioning agent, will tend to change moderately, followed at higher pressures or sorption levels by rapidly, almost exponentially increasing permeabilities. It is at this point that the membrane becomes rubberized and therefore much less useful for gas separation. The region of plasticity that is desirable from the standpoint of the present invention is observed in practice at a point of sorption where the permeability has begun to rise with increasing feed pressure but has not begun its dramatic exponential rise.

Once an appropriate level of plasticity has been achieved, as defined in physical terms by an upward inflection in a plot of permeability versus pressure, the level is maintained at or near this level for a period of time determined by the stabilization of membrane permeability. Thus, it is observed typically that the membrane permeabilities will tend to "creep" upward over a period of time, ranging from several hours for some polymers and conditioning agents to a day or more, and then stabilize. The resultant stabilization may be characterized alternatively, by an equilibrium of gas solubility and swelling or by a steady state level of permeability. During this time of stabilization or "conditioning", the membrane is also stabilized in terms of selectivity at generally slightly reduced permselectivities.

The final step entails reducing the amount of the dissolved penetrant or conditioning agent (i.e., by reducing its pressure) in the sorbed membrane to a level that will nevertheless maintain the membrane in a stabilized state until use. When the concentration of conditioning agent is reduced in this fashion, for example, to commercial levels of pressure, one observes a profound hysteresis effect on the sorption level of the gas, with a resultant enhanced permeability of the membrane. Permeability increases of up to 100% or even 300% are typically obtained with optimization of the treatment process.

Typically, the conditioning agent will be a gas having a boiling point of between about 90° and about 270° K. Preferably, though, a gas is chosen having a boiling point between a range of about 150° to about 270° K and is not known to chemically attack the material. In general, the higher the boiling point of the gas in this range, the more effective, i.e. the more strongly sorbing the gas will be, thereby enhancing its conditioning action. Typical gases falling in this range, and particularly desirable as conditioning agents, include but are not limited to $CO_2$, $C_2H_4$, $C_2H_6$, $C_3H_8$ or $C_3H_6$.

For example, when conditioning agents having a high boiling point such as $CO_2$ are employed, flux stabilization and therefore conditioning may be obtained after about as little as 2 hours, but most preferably requires about 48 hours. However, with a low boiling point conditioning agent such as ethylene, typically at least 6 hours is required and more preferably about 120 hours.

It is preferred that the conditioning gas contain essentially a single gas component of a gas having the desired boiling point. This is because gas mixtures, which may contain only a fractional component of the desired conditioning agent, would have to be pressurized significantly beyond the tolerances of the membrane in order to achieve a proper sorption level of the conditioning agent itself. However, mixtures of one or more conditioning gases may be employed, where the gas mixture contains essentially only gases having the desired boiling point characteristics.

For initial swelling of the membrane, it is desirable to define the sorption level in terms of the concentration of the dissolved gas obtained per cubic centimeter of the membrane. By defining in this manner the desired degree of swelling, i.e., by defining in terms of dissolved gas concentration, the desired sorption range can be standardized and extrapolated to different operating conditions (e.g., at different temperatures and pressures).

In certain embodiments, it is typically preferable to maintain the sorption level at between about 0.1 to about 1.0 mmoles of dissolved gas for every cubic centimeter (cc) of the polymer. This corresponds to a range of about 23 to about 230 cc of the gas, measured at STP (standard temperature and pressure), dissolved per cc of the membrane.

In more preferred embodiments, it is desirable to dissolve the conditioning agent to a level of about 0.2 to 0.4 mmoles of dissolved conditioning agent per cubic centimeter of the membrane, and most preferably, about 0.4 mmoles.

Although for initial conditioning of the membrane it is preferred to employ a gas having a b.p. between about 90° and about 270° K, for the purposes of maintaining the membrane in its conditioned state, a wider range of gases may be employed if desired. For example, gases having a boiling point of between about 60° and about 270° are effective flux maintaining agents. However, because generally the lower the boiling point the higher the gas pressure required to maintain the desired sorption levels, it is generally uneconomical to employ lower boiling point gases.

Membranes conditioned in the manner of the invention have many useful applications in the gas separation art as well as numerous other arts. For example, in the gas separation art, such membranes may of course be employed in processes for enriching for a particular gas permeate or penetrant from a mixture of gases which includes generally the steps of selecting a gas separating membrane of the polymeric glassy type; conditioning the membrane; contacting a side of the membrane with the mixture under sufficient pressure to achieve a flux of the permeating gas across the membrane; and collecting the enriched gas permeate from the downstream side of the membrane.

Although the invention is primarily directed to membranes employed in gas separation, other uses will become apparent from the present disclosure. For example, certain contact lenses, and in particular certain hard contact lenses, are typically formed of glassy-type polymers and may be treated in the manner of the invention to improve their permeability to gases. Moreover, the treatment will have application for improving the productivity of membranes used in pervaporation or reverse osmosis separations and even in barrier applications where a high permeability to gases and protection from microbial invasion are desirable.

BRIEF DESCRIPTION OF THE DRAWINGS

FIG. 2. Permeability of methane in a 900 psia $CO_2$ conditioned and unconditioned polycarbonate film for pure and mixed (50% $CO_2$/50% $CH_4$) gas mixture. The increase in $CH_4$ permeability in the mixture was stable after about 5 days, while 9 days was required for the pure $CH_4$ feed after replacing the $CO_2$ conditioning gas with pure $CH_4$.

FIG. 7. Permeability of $CO_2$ in cellulose acetate at 35° illustrating the enhanced permeability observed after conditioning for approximately 5 days at 300 psia.

FIG. 8. Permeability of Helium in polycarbonate at 35° C illustrating the lack of enhancement in permeability observed after conditioning at 900 psia with $CO_2$ for approximately five days prior to replacing with $CO_2$ with pure Helium.

FIG. 9. Composite plot of permeability of $CO_2$ through polycarbonate at 35° C. illustrating the magnitude of the hysteretic permeation behavior observed following conditioning at different pressures. Note that essentially no benefit was achieved at 300 psia even after 7 days.

DETAILED DESCRIPTION OF THE PREFERRED EMBODIMENTS

Figure 1:
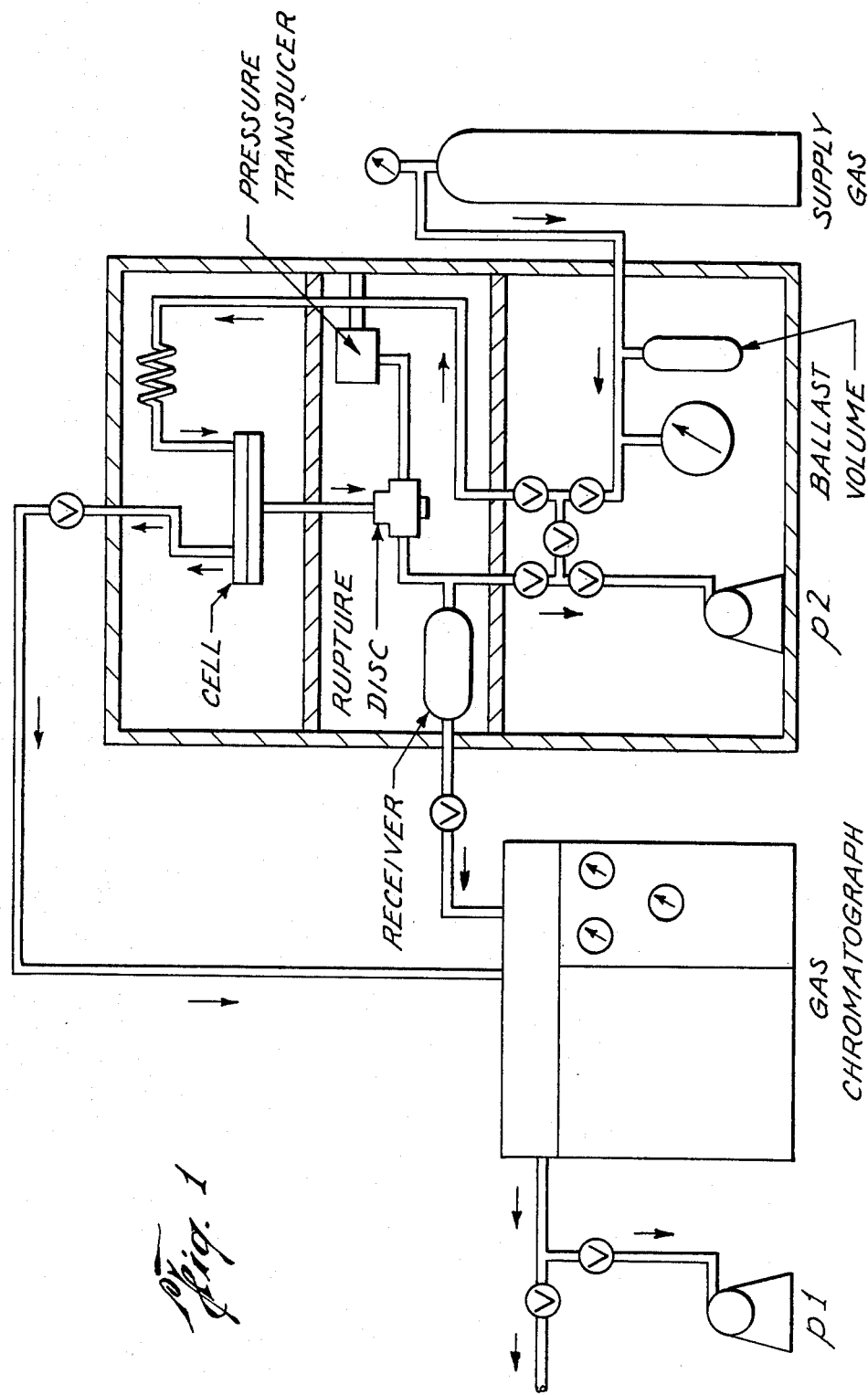
FIG. 1. Entire mixed gas permeation system including gas chromatograph and supporting equipment.

As noted, the invention relates generally to the conditioning of gas permeable membranes of the glassy polymeric type to improve their permeability to gases. The invention is applicable to all glassy-type polymers and particularly to glassy amorphous polymers, semicrystalline glassy polymers, heterochain polymers, miscible blends of each of the foregoing, and to copolymers of two or more monomers or blends of copolymers of these. Table I below includes a number of typical glassy polymers used to make gas separating membranes. However, this listing should in no way be construed as limiting the general applicability of the invention to other gas separating glassy polymers such as, for example, as disclosed by U.S. Pat. Nos. 3,822,202; 4,521,224; and 4,575,385, all incorporated herein by reference.

TABLE I

| Polymer Class | Typical Structure |
|---|---|
| Polycarbonate<br><br>$+R-O-\overset{O}{\underset{\|}{C}}-O-R'-O-\overset{O}{\underset{\|}{C}}-O+$<br>(condensation polymer) | (structure shown)<br>y = H, Cl, Br, CH$_3$, etc.<br>x = hydrocarbon chains |
| Polyester<br><br>$+R-O-\overset{O}{\underset{\|}{C}}-R'-\overset{O}{\underset{\|}{C}}-O+$<br>(condensation polymer) | (structures shown)<br>y = H, CH$_3$, etc.<br>x = —(CH$_2$)$_N$—, etc. n = 2-6 |
| Polyamide<br><br>$+R-\overset{H}{\underset{\|}{N}}-\overset{O}{\underset{\|}{C}}-R'-\overset{O}{\underset{\|}{C}}-\overset{H}{\underset{\|}{N}}+$<br>(condensation polymer) | (structure shown) |
| Polyimide<br><br>(structure shown)<br>(condensation polymer) | (structure shown)<br>$x = -O-, -CH_2-, -\underset{\underset{CH_2}{\|}}{\overset{\overset{CH_3}{\|}}{C}}-, -\underset{\underset{CF_3}{\|}}{\overset{\overset{CF_3}{\|}}{C}}-$, etc. |
| Polysulfone Aryl Ester<br><br>$+\overset{O}{\underset{\underset{O}{\|\|}}{\overset{\|\|}{S}}}-R-O-R'+$<br>(condensation polymer) | (structure shown)<br>$x = -CH_2-, -\underset{\underset{CH_3}{\|}}{\overset{\overset{CH_3}{\|}}{C}}-$, etc. y = H, Cl, Br, CH$_3$ |
| Substituted Acetylenes<br><br>$+\underset{\underset{R}{\|}}{\overset{\overset{H}{\|}}{C}}=\underset{}{\overset{\overset{CH_2-CH_2}{\|}}{C}}+$<br>(addition polymer) | $+\underset{}{\overset{\overset{H}{\|}}{C}}=\underset{\underset{x}{\|}}{\overset{\overset{CH_2-CH_3}{\|}}{C}}+$<br><br>x = (phenyl), CH$_3$, —CH$_2$—CH$_3$, etc. |

TABLE I-continued

| Polymer Class | Typical Structure |
| --- | --- |
| Alpha-substituted Olefin<br>$\begin{array}{c} H\ H \\ \mid\ \mid \\ +C-C+ \\ \mid\ \mid \\ H\ X \end{array}$<br>(addition polymer) | $\begin{array}{c} H\ H \\ \mid\ \mid \\ +C-C+ \\ \mid\ \mid \\ H\ X \end{array}$<br>x = Cl, phenyl, etc. |
| Modified Cellulosics<br>(modified naturally<br>occuring polymer) | cellulose acetate |

In general, the invention relates to the ability of certain gases to selectively sorb in certain gas separating polymers, in this case the glassy type membranes. It has surprisingly been found that by selectively sorbing a defined conditioning gas into these membranes, to a certain defined degree, the polymeric arrangement is conditioned to a state of improved gas flux capabilities without significant loss of their permselectivities. In general, membranes are swelled to a state of plasticity without their becoming rubberized, maintaining them in such a swelled state to allow equilibration and stabilization of the conditioned flux capability, and further maintaining at least a minimal sorption level prior to their use. This later requirement arises from the observation that when the conditioning or maintaining agent is totally exchanged with a nonmaintaining gas, the membranes are found to significantly reduce their improved capabilities.

In general, gases useful as conditioning agents are those gases having a boiling point between about 90° and about 270° K and are not known to chemically react with the polymer. A representative listing of gases falling in this range are shown below in Table II. However, as with the listing of glassy membranes, this list is non-exclusive. The conditioning gas is believed to function by virtue of its physical rather than its chemical attributes. That is, rather than interacting chemically with the polymer, the gas molecules are, by virtue of their molecular size and condensability, believed to be physically altering the underlying structure of the polymer matrix. The higher the boiling point of a gas such as those given in Table II, the more active the gas is in achieving this result. This is due to the higher condensability and, hence, higher sorption levels at a given exposure pressure for the higher boiling point gases. Therefore, preferably, conditioning gases having boiling points between about 150° and about 270° K, and most preferably between about 190° and about 270° are employed.

For conditioning a membrane formed of a selected polymer it is important to select a conditioning gas that is chemically inert with respect to that polymer. For example, halide gases such as $Cl_2$, HBr and HCl are known to be chemically reactive with various glassy polymers, particularly polymers having aromatic structures. Moreover, gases such as NO are also known to be highly reactive with certain polymers under certain conditions and can lead to chain scission or degradation upon exposure to such gases. Of course, these gases will not react with all polymers and may be employed to condition membranes formed of non-reactive polymers. Accordingly, a conditioning gas should be chosen that is chemically inert with respect to the selected polymer. The selection of a proper polymer-inert conditioning agent can therefore be predicated on knowledge of such chemical reactions as is generally well known in the art.

TABLE II

| Conditioning Agents | |
| --- | --- |
| Penetrant (Gases) | $T_b$ (°K.) |
| $CO_2$ | 194.7 |
| $C_2H_2$ | 189.2 |
| $N_2O$ | 184.7 |
| $SO_2$ | 263.0 |
| $C_2H_6$ | 184.5 |
| $C_2H_4$ | 169.4 |
| $H_2S$ | 212.8 |
| $CF_4$ | 145.2 |
| $SF_6$ | 209.3 |
| $NH_3$ | 239.7 |
| $C_3H_8$ | 231 |
| $C_3H_6$ | 225 |

While the invention contemplates in a preferred mode the use of pure or substantially pure conditioning agents, mixture of agents may be employed so long as there is a sufficient conditioning gas component of such mixture to effectuate the molecular conditioning. Typically, however, for most membrane configurations this will require that, if a gas mixture is employed, the mixture must be a mixture of conditioning gases. Thus, for gas mixtures, it is necessary to use a sufficient pressure of the gas mixture to produce sufficient sorption to plasticize the membrane and thereby cause the favorable permeability increase.

Although the sorption determination is typically expressed in terms of cc gas (STP)/cc polymer, this term may be somewhat confusing in that it refers to a gas measurement under standard temperature and pressure and accordingly does not reflect the volume per se of the gas in the membrane. Thus, it is often convenient to express the concentration of gas as a mole concentration, by the conversion ratio of 1 mmole of gas equals 230 cc of that gas at STP.

For sorption of glassy polymers to a conditioned state in the manner of the invention, one must first partially plasticize the membrane. Sufficient plasticization in most membranes will be observed at a sorption level of between about 0.1 and about 1.0 mmoles conditioning agent per cc of membrane. However, membranes are preferably sorbed to a level of above 0.2 mmoles/cc, or even more preferably, 0.4 mmoles/cc, to achieve truly surprising permeability increases.

The upper limit is bounded by the rapid onset of rubberization of the polymer, which can be seen as low as 300 psia for polymers such as a polymer blend of polyvinylidene flouride or polymethylmethacrylate, or as high as 1000 psia for polymers such as polycarbonate. An appropriate maximal level of sorption can be determined empirically for any given polymer membrane by measuring the highest pressure at which concave C vs p isotherms are observed upon pressurization of the polymer with the conditioning gas. This maximal level can be verified by determining the highest pressure at which, upon depressurization, marked hysteresis in the C vs p isotherm is observed. These two estimates of the maximal pressure are typically roughly equivalent; however, if they are found to differ, the latter hysteresis criterion should be used.

The length of conditioning time required to achieve a steady-state flux and resultant stabilization of the conditioned state will generally be a matter of the particular application, i.e., membrane type, size, device, etc. However, once the time and conditions have been ascertained for a particular set of membrane conditions or a particular commercial device, these conditions may be routinely employed. Empirically, this is determined by appropriately swelling membranes to a conditioning level, and independently measuring resultant membrane permeabilities at subsequent times, such as various hours and days later. Once the permeability and/or selectivity is found to stabilize, the membrane conditioning is also found to stabilize. At this point, the membrane may be partially desorbed until use, and the increased permeability preserved.

Typically, a time period of conditioning of about 2 to 6 hours is required, more preferably a time period of 24 hours, and most preferably a time period of 48 hours is employed to condition most membranes, when maintained at optimum sorption levels.

After the membrane is properly swelled and stabilized, the conditioning gas may be exchanged with a second broader range of flux maintaining gases. Typically, the flux maintaining gas may be a single gas, a gas mixture, or even a feed gas mixture which will be eventually separated by the membrane. Once the membrane is stabilized, the condensability of the gas is not quite so important, and gases having a broader range of boiling points may be employed. In this regard, conditioning agents may be defined generally as gases having a boiling point range of between about 60° and about 270° K. Table III below lists a number of gases which, in addition to those included as conditioning agents in Table II, may be employed as flux maintaining agents. It will be appreciated, however, that this list is not intended to be all-inclusive.

TABLE III

| Additional Maintaining Agents | |
|---|---|
| Penetrant (Gases) | $T_b$ (K) |
| $CH_4$ | 111.7 |
| $O_2$ | 90.2 |
| Ar | 87.3 |
| Kr | 119.8 |
| CO | 81.7 |
| $N_2$ | 63.3 |

Gases having bp's falling outside this range, such as helium (b.p. =4° K), cannot be employed to either condition or maintain membranes in that the sorption level is not sufficient to produce plasticization or maintain a conditioned film in a conditioned state.

Because membranes tend to lose their improved characteristics if not properly maintained, it is generally required to retain at least some lower limit level of conditioning or maintaining agent dissolved in the membrane. While, again, this may be determined expirically, a sorption level of at least 0.03 mmoles gas/cc polymer has been found to maintain the conditioning adequately.

The following examples are illustrative of certain preferred embodiments of the invention and should not be construed as limiting further embodiments. However, these examples do demonstrate the practice of embodiments of the inventions in a manner found to be preferred processes.

EXAMPLE I

CONDITIONING PROCEDURE FOR CONDITIONING DENSE POLYMER FILMS FOR IMPROVED GAS FLUX

An example follows of a procedure employed for the conditioning of polycarbonate by carbon dioxide at two conditioning pressures at 35° C. A three inch circular disk sample of polycarbonate was mounted in a permeation measurement device, which is shown in FIG. 1. The sample was cut from an extruded film sheet of bisphenol-A-polycarbonate that was 5 mils thick. The polycarbonate was supplied in extruded dense film form from General Electric. The density of the film was measured using an aqueous density gradient column to be 1.1996 gm/cc. No chemical, thermal or mechanical pretreatment of the polycarbonate film was undertaken before mounting in the permeation device.

First a vacuum was pulled on both faces of the membrane for 48 hours to completely degas the film before exposure to $CO_2$. The pressure on the upstream face was then increased in a stepwise fashion up to a conditioning pressure. At each intermediate pressure between vacuum and the conditioning pressure a sufficient time was allowed for the system to reach a steady state permeability value. However, waiting for steady state at the intermediate points was not critical so long as the pressure was maintained sufficiently long at the conditioning pressure. The pressure was maintained at the conditioning pressure for a five day period to allow the sample to creep slowly to a new stable, steady state value of a higher permeability level. At the end of this conditioning period, no significant drifts in the permeability were observed.

After conditioning at a $CO_2$ pressure of 900 psia, subsequent partial depressurization from 900 psia resulted in a permeability ranging upward to a level as high as 90% above what was measured during pressurization. The conditioning treatments produced not only an increase in pure $CO_2$ permeability but also an increase in $CO_2$ permeability in a 50/50 mixture of $CO_2$ and $CH_4$. That is, the increase in $CO_2$ permeability found in the pure gas studies was essentially preserved for the conditioned film in the mixed gas studies.

Another experiment was performed in which a polycarbonate film was first conditioned with the procedure described above followed by partial depressurization of the conditioning agent, $CO_2$, to 500 psia. Then the $CO_2$ was gradually replaced by pure $CH_4$ also at 500 psia. The permeability of the pure $CH_4$ after complete removal of $CO_2$ was determined to be 50% higher than for pure $CH_4$ through a polycarbonate film which had not undergone this conditioning process (FIG. 2).

EXAMPLE II

Figure 3:
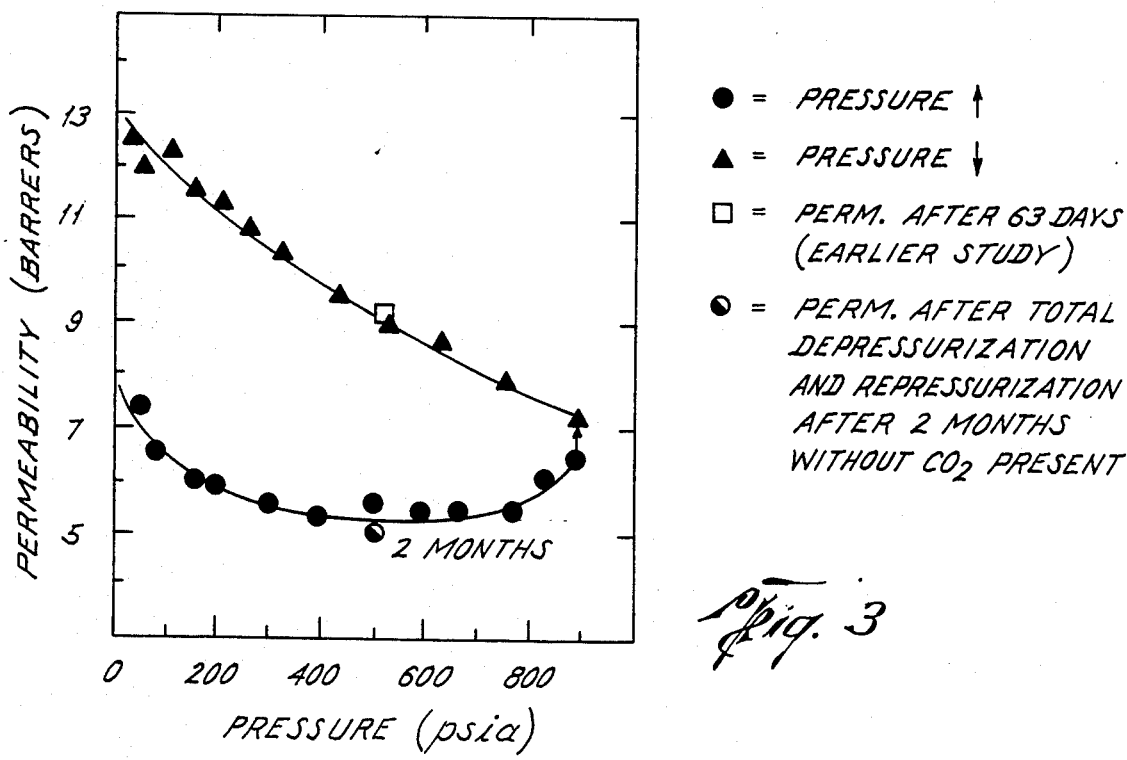
FIG. 3. Permeability of $CO_2$ through polycarbonate at 35° C. illustrating the hysteretic behavior observed following conditioning, ● —pressure increasing; ▮ =pressure decreasing; ☐ =permeability after 63 days and ◐ =permeability after total depressurization and repressurization.

A polycarbonate membrane was pressurized in the manner of Example I and depressurized after 5 days following equilibration of the gas permeability. The enhanced permeability of the conditioned membrane upon depressurization is shown in FIG. 3 (closed triangle). After 63 days of testing at 500 psia on the conditioned film, the improved permeability was maintained (open square). However, if the membrane was totally depressurized following conditioning, no improvement in permeability was noted after two months (half-open circle).

EXAMPLE III

Figure 4:
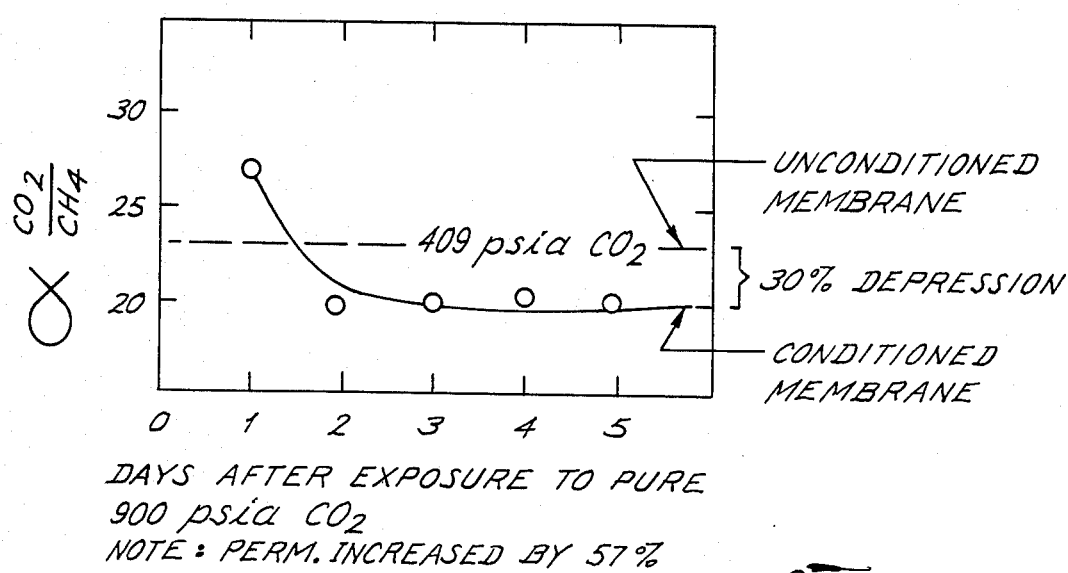
FIG. 4. Selectivity of conditioned polycarbonate for the $CO_2$/$CH_4$ system as a function of time for a $CO_2$ partial pressure of 409 psia.

A polycarbonate membrane was conditioned in the manner of Example I. Following the application of a conditioning pressure of $CO_2$ (900 psi), membranes were reduced to a pressurization of 409 psia $CO_2$, a feed gas mixture at a total pressure of 800 psia containing 50% molar ratios of $CO_2/CH_4$ was applied, and the membranes tested for their permselectivity. The results are shown in FIG. 4. As will be appreciated from FIG. 4, the conditioned membrane was found to exhibit a 30% depression of selectivity with a 57% increase in permeability. This enhanced permeability and slightly reduced selectivity were found to be stable.

EXAMPLE IV

Membranes formed of polymethyl-methacrylate (PMMA) were conditioned in the manner of Example I, except that a lower $CO_2$ pressure (300 psia) was needed to induce the characteristic onset of plasticization.

Figure 5:
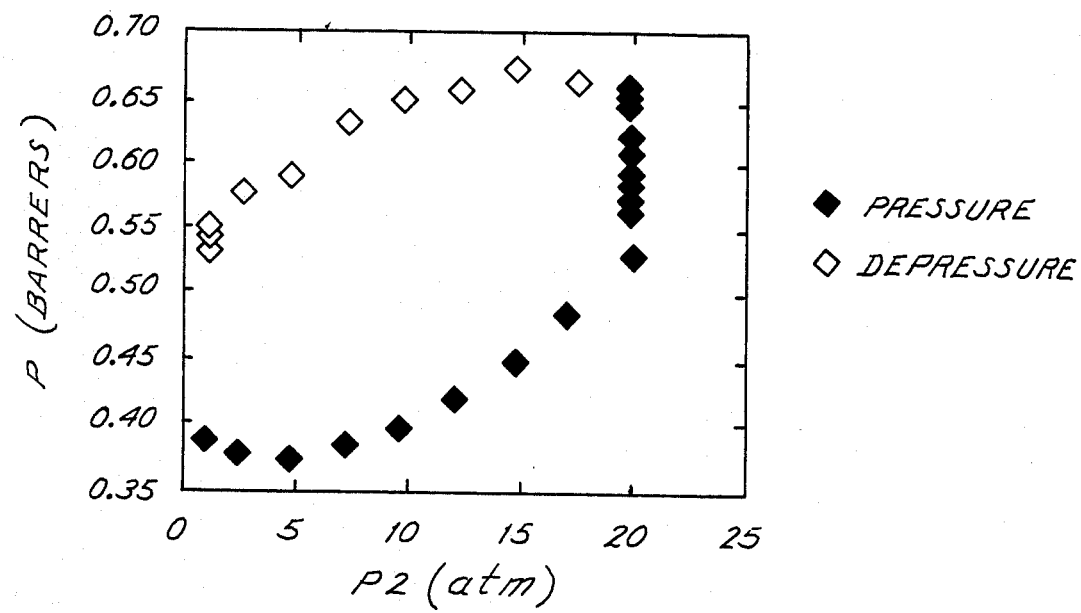
FIG. 5. Permeability of $CO_2$ in polymethylmethacrylate (PMMA) at 35° C. illustrating the enhanced permeability observed after conditioning.◆- pressure increasing; ◇ - pressure decreasing.

As will be appreciated from FIG. 5, PMMA membranes, when treated at a $CO_2$ pressure of about 20 atmospheres (300 p.s.i.) for fourteen days, exhibited a gradual increase in the permeability, ranging from an initial permeability of about 0.5 Barrers on day 1, to a final steady-state permeability of about 0.65 Barrers after fourteen days. At this $CO_2$ pressure, PMMA is found to obtain a sorption level of about 30 cc(STP)/ cc polymer (about 0.13 mmoles gas/ cc polymer). Reduction in the $CO_2$ pressure resulted in a retention, if not further improvement, in the permeability.

EXAMPLE V

Membranes composed of RPC100, a copolymer of MMA and styrene, were subjected to 20 atmospheres of $CO_2$ at 35° C. (300 p.s.i.) and the pressure maintained for fourteen days as in Example IV.

Figure 6:
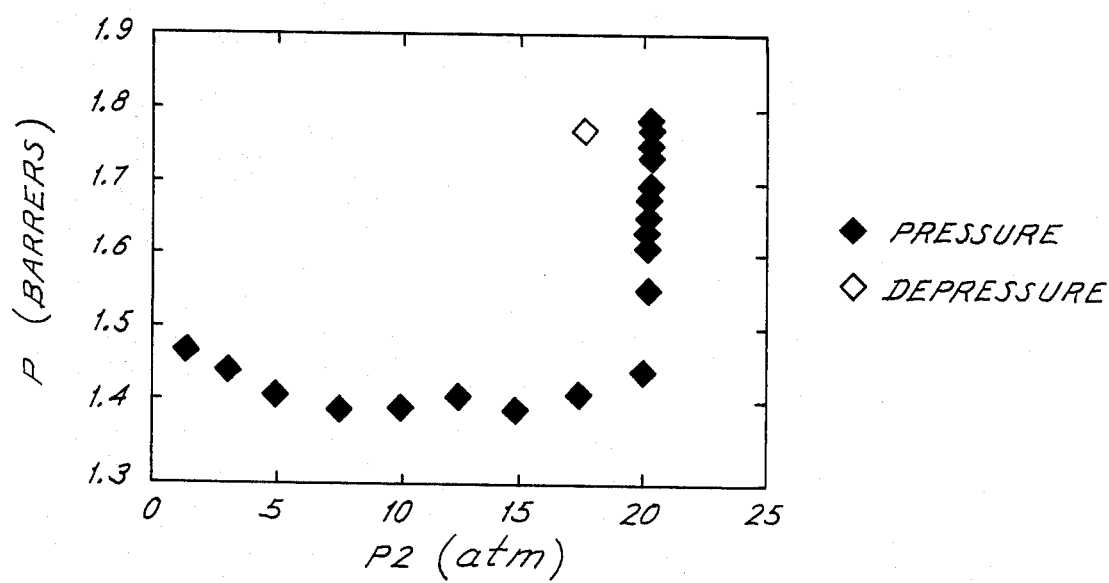
FIG. 6. Permeability of $CO_2$ in RPC100 at 35° illustrating the enhanced permeability observed after conditioning. ▶ =pressure increasing; ◇ =pressure decreasing.

As will be appreciated from FIG. 6, the permeability of the membrane slowly crept upward, from about 1.4 to about 1.8 Barrers over this period of time.

Permeability increase of approximately 30% was observed upon depressurization to about 17 atm.

EXAMPLE IV

Membranes formed of cellulose acetate were pressurized with 30 atm. $CO_2$, which resulted in a sorption of $CO_2$ of about 0.15 mmoles $CO_2$/ cc polymer. The membranes were maintained at this sorption level for a period of five days. As will be appreciated from FIG. 7, the permeability of the membrane crept upward, from 5.5 Barrers to 6.75 Barrers over this period. Reduction in the $CO_2$ pressure resulted in an improvement of almost 100% compared to the unconditioned sample.

EXAMPLE VII

In order to demonstrate the inability of a nonincluded gas such as helium (b.p. 4° K) to maintain the membrane in a conditioned state, the following experiment was performed. The polycarbonate film was conditioned at 900 psia of $CO_2$ in the manner described in Example I. The polycarbonate film was then depressurized to 500 psia and allowed to settle at this pressure for one day. The $CO_2$ gas was then replaced by purging the feed with 500 psia of pure helium without depressurization of the film.

As will be appreciated from the data of FIG. 8, the solubility level of helium was not sufficient to maintain the polycarbonate in its conditioned state.

EXAMPLE VIII

To demonstrate that membranes must be pressurized to a relative state of plasticity to obtain the improved state of permeability upon relaxation, polycarbonate membranes were treated at 300, 600 and 900 p.s.i. $CO_2$ at 35°, corresponding to sorption levels of about 0.12, 0.24, and 0.35 mmoles $CO_2$ dissolved/cc polymer, respectively. The membranes were pressurized for seven days, and then depressurized. The permeability data that were obtained are shown in FIG. 9.

As will be appreciated, a conditioning pressure of 300 psia resulted in virtually no improvement in permeability, whereas 900 psia for seven days improved permeability by a factor of more than 2. Intermediate conditioning pressures between 300 and 900 psia resulted in varying levels of improvement with the greatest enhancement seen for a conditioning pressure of 900 psia.

EXAMPLE IX

Comparison of Glassy Polycarbonate and Silicone Rubber Membranes

1. Experimental (a) Materials

The silicone rubber used in this study was supplied by General Electric Company, Silicone Products Division. The 30 mil thick sample had been postcured for 4 minutes at 400° F. prior to receipt. The sample density was reported to be 1.10±0.03 g/cc and the crosslink density was determined to be $V_e/V_o = 1.24 \times 10^{-4}$ gm mole/cc.

General Electric Company also supplied the polycarbonate sample used in this study. The film sample had a density of 1.200+0.001 g/cc and a thickness of 5.0 mil.

The pure $CO_2$ and $CH_4$ gases were supplied by Linde, Inc. at a purity of 99.99%. The 50/50 molar $CO_2/CH_4$ mixture used in this study was also supplied by Linde, Inc.

(b) Equipment and Procedures

Figure 10A:
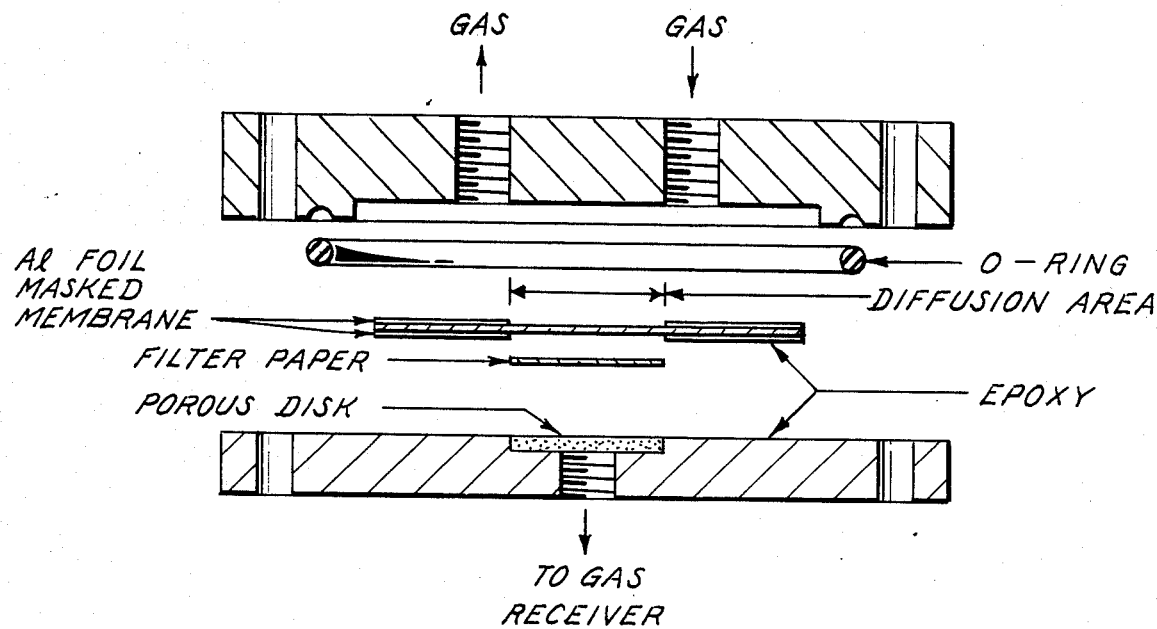
FIG. 10. Detailed permeation cell schematics. (a) Cell type 1 with epoxy seal using aluminum foil mask on top and bottom of membrane. (b) Cell type 2 with double O-ring seal using aluminum foil mask only on bottom of membrane.

The permeability of pure $CO_2$ and $CH_4$ in silicone rubber and polycarbonate was measured using standard permeation techniques (Koros et al. (1977), *J. Membr. Sci.*, 2:165, incorporated herein by reference). The permeation cell design is shown in FIG. 10a. Due to the adhesive nature of the silicone rubber sample, the film was masked only on the upstream face with a piece of aluminum foil, to define an accurate diffusion area of 9.54 cm². The bottom side was not masked, instead it was placed directly on the bottom half of the cell with a piece of filter paper over the sintered metal disk. Due to its slightly adhesive nature, silicone rubber formed a seal with the metal and additional adhesives were not required.

Figure 10B:
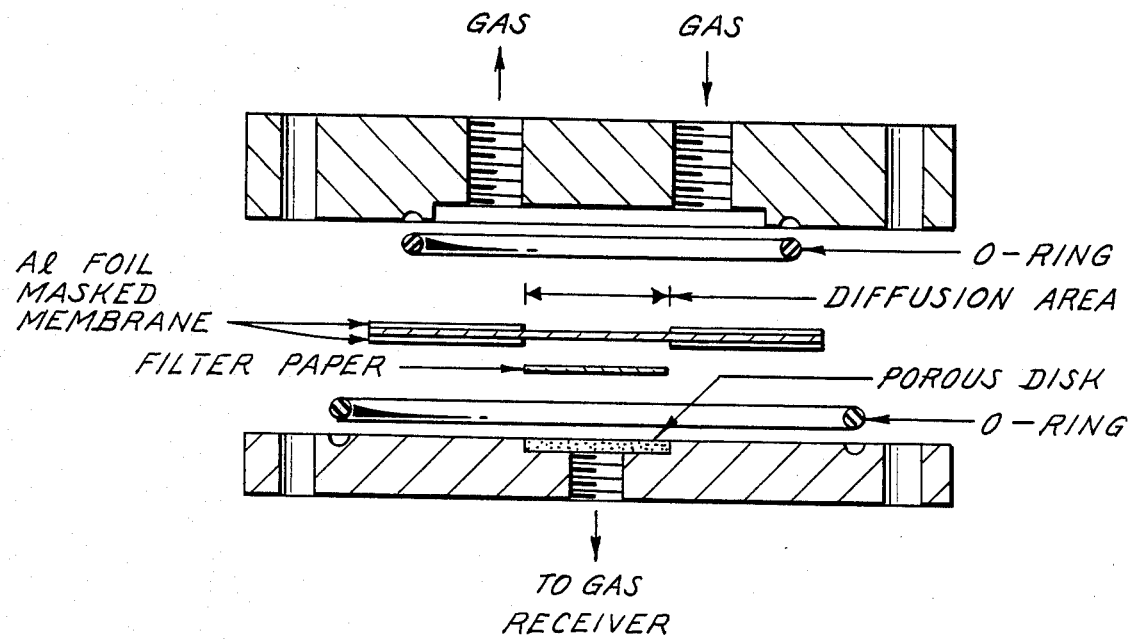

Pure methane and gas mixture [50/50 of $CO_2/CH_4$]permeabilities were measured for polycarbonate by masking a film with aluminum tape and then mounting it on the cell bottom with "Five Minute Epoxy", as shown in FIG. 10b. This technique has proven to be very effective for studying a range of glassy materials including samples that would be destroyed by stresses induced by an O-ring. The permeability of $CO_2$ in polycarbonate was measured using two different mounting techniques. The first method is identical to the one just described above for $CH_4$ in polycarbonate. The second method evolved out of a desire to eliminate potential problems due to high levels of $CO_2$ which sorbed into the epoxy and adhesive mask on the top face of the membrane used in the standard mounting process. At high pressures, due to the exceedingly high $CO_2$ uptake near the critical point, the epoxy and adhesive become saturated with $CO_2$, thereby making it difficult to depressurize the film without delaminating the epoxy from the cell bottom or disrupting the mask from the film. A double O-ring design, shown in FIG. 10b, was used to eliminate this problem. A polycarbonate film was masked on the downstream face to define a diffusion area of 9.54 $cm^2$. The inner O-ring provided the critical seal while the outer O-ring provides added security. Regardless of which type of mounting system was employed, a piece of filter paper was placed between the polymer film and the sintered metal to protect the film from direct contact with the rough metal surface.

The specific details of the permeation apparatus were as shown in FIG. 1 (e.g., see O'Brien et al. (1986), *J. Membr. Sci.*, 29:229). The schematic shown includes the piping necessary to make mixed gas measurements. Pure gas measurements do not utilize the tap on the upstream face of the cell and simply use a single feed line. The additional upstream line is used as a purge during mixed gas runs to eliminate possible concentration polarization that might occur. It is also used as a means of sampling the feed line. The purge rate was set so that the stage cut was less than 0.01%. A slow purge was also used for extended conditioning runs to eliminate the possibility of anomalous effects that might result from trace impurities in the gas supply as gas permeation of the essentially pure component proceeded over extended periods.

Figure 11:
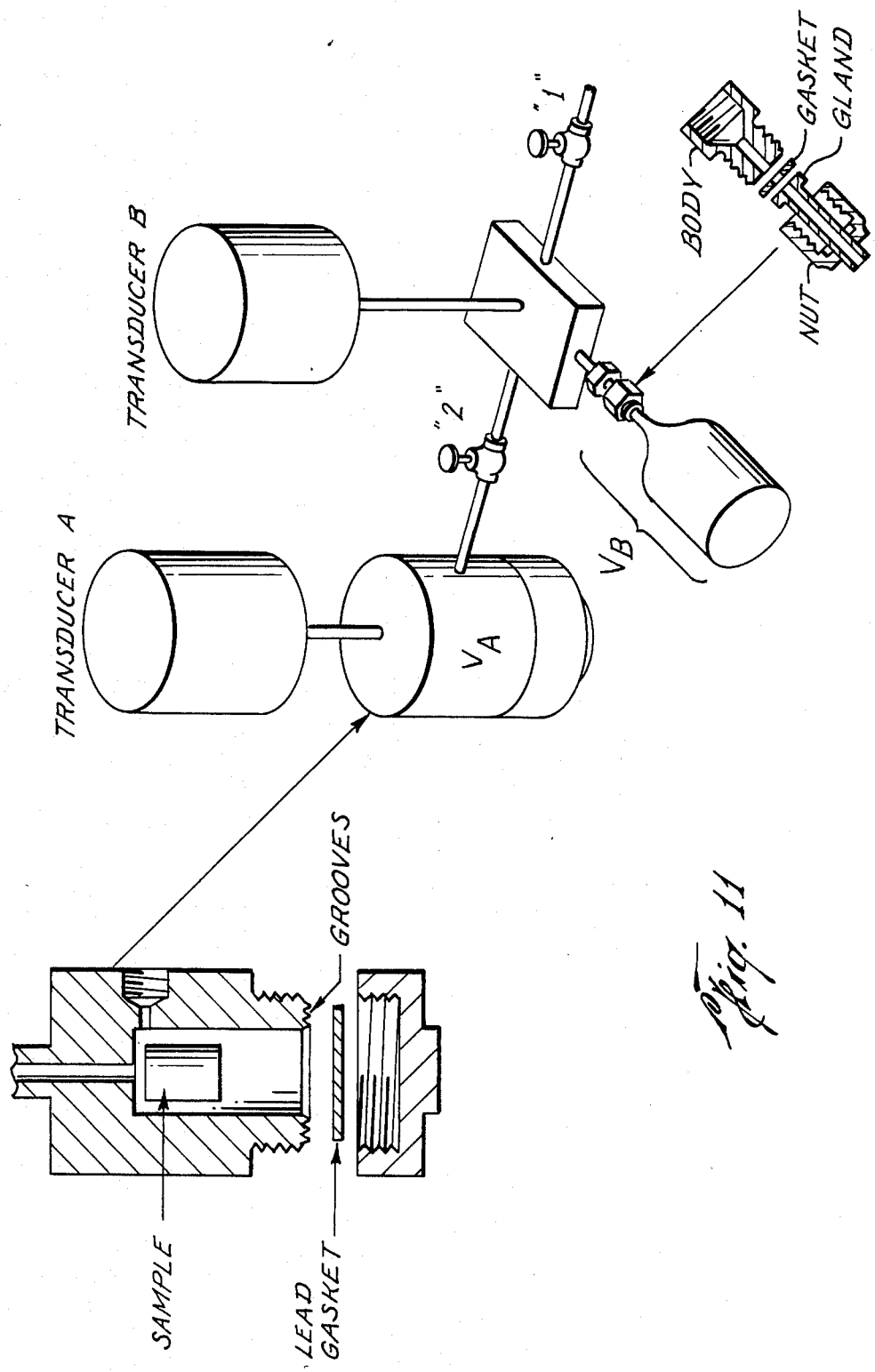
FIG. 11. Schematic of dual volume cell used for sorption studies by pressure decay.

Pure gas sorption measurements reported in this study were made with a dual volume pressure decay method. This apparatus uses a material balance concept to account for every mole in the system. This approach offers excellent reliability, accuracy, and precision for pure gas measurements. For pure gas sorption measurements, a dual volume dural transducer apparatus is employed. In this equipment, shown in FIG. 11, chamber B is used to accurately meter an increment of gas into the polymer containing chamber, $V_A$. The material balance is performed by measuring the pressure in chamber B before and after the expansion of gas into chamber A. Using an equation of state, the actual number of moles of gas transferred to the polymer-containing chamber can be calculated. By monitoring the pressure decay in chamber A, pressure equilibrium can be determined, and the moles of gas in the gas phase can be calculated. The moles of gas sorbed into the polymer can then be determined by subtraction of the moles of gas present in the gas phase of chamber A from the total moles of gas transferred to the polymer-containing volume.

To perform conditioned mixed gas runs, the upstream face of the polycarbonate film was first exposed to $CO_2$ at 900 psia for approximately five days. The sample was then slowly depressurized to the corresponding pressure to match the $CO_2$ partial pressure in the mixture. The valve connecting the gas supply to the upstream face was then closed, thereby isolating the film. The gas supply volume and corresponding lines were then carefully evacuated and the mixed gas cylinder was connected. After the pressure had been adjusted to give a $CO_2$ partial pressure equalling the present upstream pressure, the valve to the upstream face was opened again. A high purge rate was used initially until the mole fractions of the purge stream equals the mole fraction of the gas supply (approximately 30 minutes). Then the purge rate is reduced to a stage cut of 0.01% for the faster permeating gas.

2. Silicone Rubber

Figure 12A:
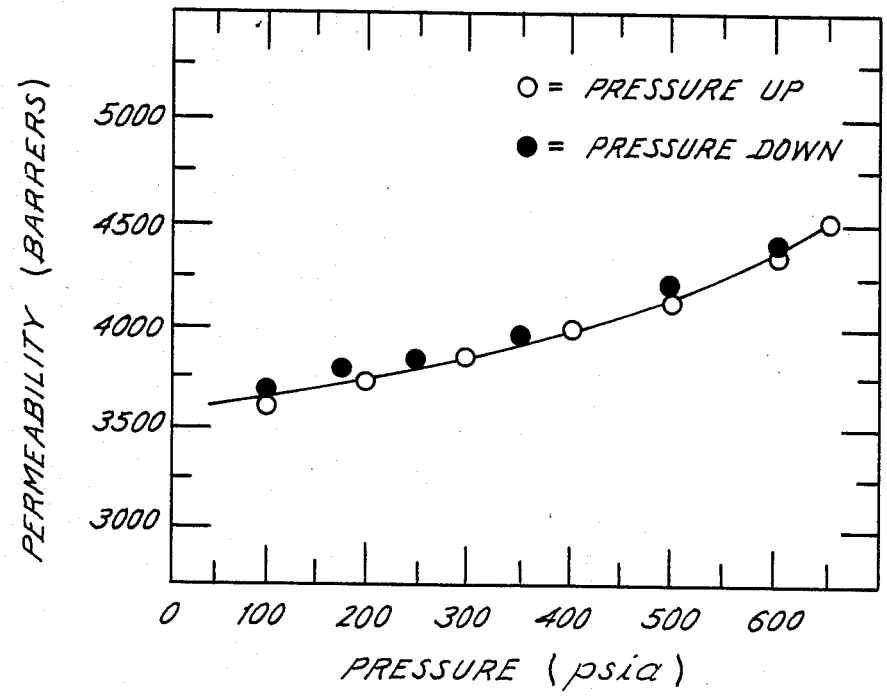
FIG. 12. The permeability of (a) $CO_2$ and (b) $CO_4$ through a 30 mil thick silicone rubber sample at 35° C.
Figure 12B:
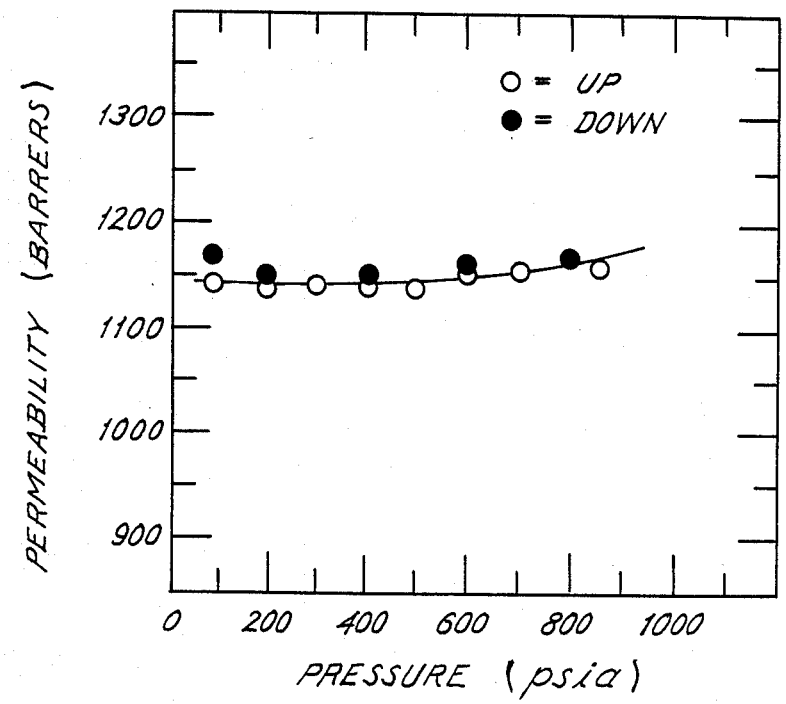

FIG. 12a shows the permeability of $CO_2$ in silicone rubber at 35° C. The permeability of $CO_2$ in silicone rubber was measured only up to a pressure of 700 psia. Above this pressure, the downstream reservoir volume in the system reached a pressure above the reading level of the transducer (10 mmHg) so quickly that the flux measurements could not be made accurately. The $CO_2$ permeability in FIG. 11a measured under the conditions of systematically increasing pressure agree, within experimental error, with those measured for decreasing pressure. Similarly, examination of FIG. 12b also indicates no hysteretic behavior for methane in silicone.

3. Polycarbonate

The permeability of $CO_2$ in polycarbonate at 35° C. is shown in FIG. 3. Above 800 psia the $CO_2$ permeability began to increase rapidly due to the onset of plasticization. The pressure was maintained at 900 psia over a five day period to allow the sample to creep slowly to a new stable, steady state value. At the end of this time, no significant drifts in the permeability were observed, and subsequent depressurization from 900 psia produced the hysteretic behavior shown in FIG. 3.

This behavior agreed with the corresponding behavior for sorption and volume measurements. Sufficient time elapsed upon depressurization from 900 psia to assure that changes in permeability at any given pressure varied no more than ±0.5% over a five day period. Slow depressurization of $CO_2$ from 900 psia to 500 psia resulted in an initial permeability increase of 57%. To assure that no additional changes in the permeability would result another conditioned polycarbonate film was held at 500 psia for a total of 63 days, and the permeability remained virtually unchanged after the initial relaxations had occurred and a new "semipermanent" state was achieved.

The final permeability value was 57% higher than the permerbility found prior to conditioning at 500 psia, in good agreement with the results found for the previously mentioned film. Thus, one might say that the hysteretic behavior results in the existence of two semipermanent state occurring at the same upstream driving pressure. If slow time dependent relaxations downward toward the unconditioned permeability were occurring in the presence of $CO_2$, the changes were not observable over the two month period of observation using sensitive equipment capable of detecting changes of ±0.5% in permeability. A marked difference in the permeability versus pressure response of $CO_2$ in silicone rubber and in polycarbonate is evident.

Finally, after complete depressurization of $CO_2$, followed by exposure to a vacuum source (10 mm Hg) for four days, subsequent repressurization of the sample to 500 psia results in an initial permeability value about equal or only slightly higher than the permeability measured prior to conditioning. Following these $CO_2$ permeability measurements, the sample was slowly depressurized to atmospheric pressure and allowed to relax for approximately two months. Upon repressurization with $CO_2$ the permeability was found to be slightly lower (4-6%) at all pressures than for the as-received films prior to the conditioning treatment. A possible explanation for these observations is that small amounts of $CO_2$-induced aggregation occurred when polycarbonate was exposed to high levels of $CO_2$; however, these effects were masked by residual dilation of the glassy matrix remaining after only four days under vacuum. That is, sufficient time was not allowed for elimination of the unrelaxed volume introduced during conditioning.

Figure 13:
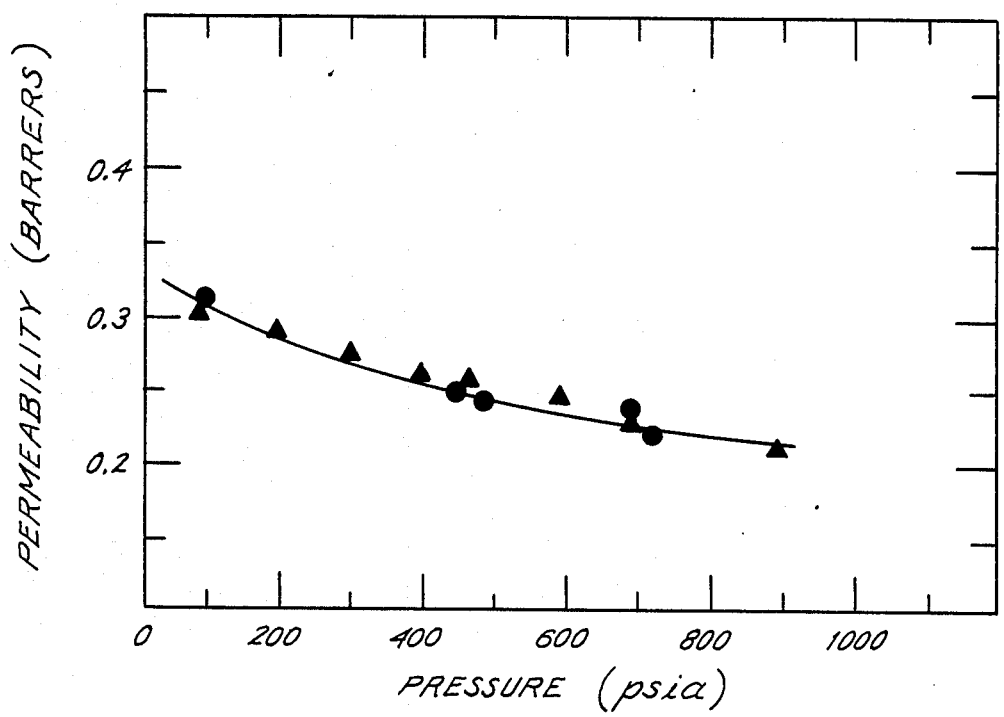
FIG. 13. Permeability of $CO_4$ through polycarbonate at 35° C▮=pressure increasing ●=pressure decreasing.

FIG. 13 shows the permeability of $CH_4$ in unconditioned polycarbonate at 35° C. The permeability of methane decreases with increasing upstream pressure, characteristic of gas/glassy polymer systems. The methane permeability response differs from that of carbon dioxide in several respects. First, at pressures above 800 psia, $CO_2$ permeability quickly increases due to the plasticizing nature of $CO_2$; however, the methane permeability does not display the same rapid increase above 800 psia. Second, methane permeability did not exhibit any hysteresis upon depressurization from 900 psia whereas $CO_2$ showed an increase of as much as 90% above the original, unconditioned permeability. Due to methane's relatively low boiling point, it would be necessary to pressurize membranes to at least 2000 p.s.i. before significant hysteresis effect would be observed.

4. Pure $CO_2$; Conditioned vs. Unconditioned Samples

Figure 14:
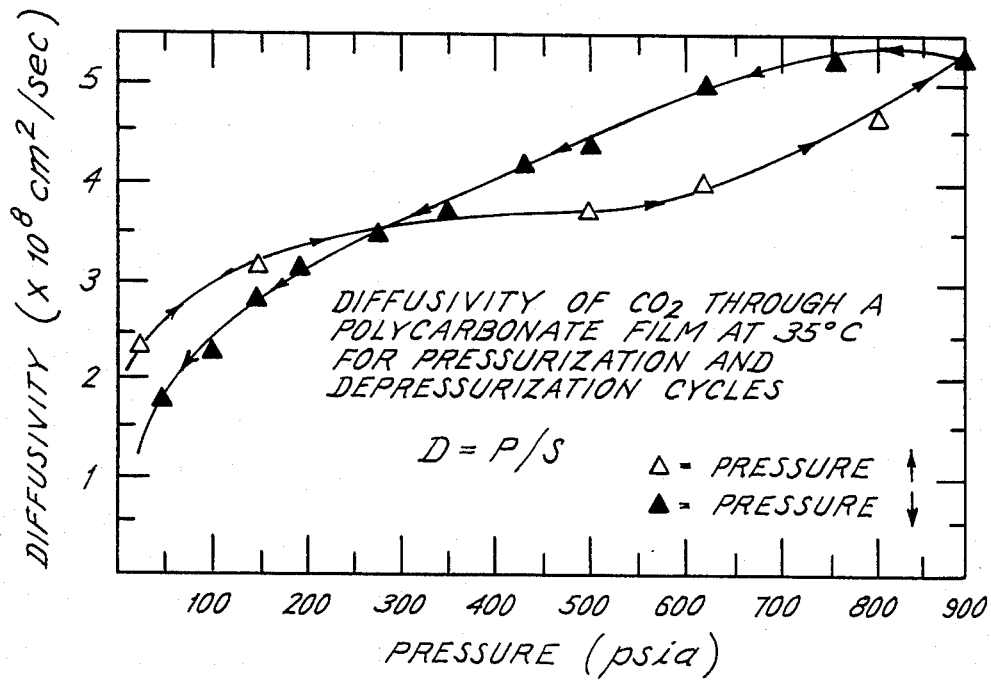
FIG. 14. Diffusivity of $CO_2$ through a polycarbonate film at 35° C. for pressurization and depressurization cycles.

FIG. 14 shows the hysteretic response of the average diffusivity of $CO_2$ in polycarbonate. This average diffusion coefficient was calculated at the ratio of the permeability values and solubility values. The onset of plasticization is apparent, since the diffusion coefficient begins to increase rapidly with increasing upstream around 600 psia. Subsequent depressurization from 900 psia, results in an increase in the diffusivity compared to pressurization conditions at equivalent pressures from 900 psia to 300 psia. Below 300 psia, the diffusivity takes on values slightly below those found for the unconditioned film.

The markedly different permeation responses for silicone rubber and glassy polycarbonate following a high pressure conditioning treatment with $CO_2$ reveal the fundamentally different natures of rubbery and glassy materials. Lack of hysteresis in the permeability of both $CO_2$ and $CH_4$ for silicone rubber is consistent with sorption and volume dilation results for $CO_2$ measured earlier for this system. The time scale for rearrangements of segments in the rubber is sufficiently rapid to preclude observation of the kinetics of the process.

On the other hand, for the glassy polycarbonate, the permeability hysteresis suggests that semipermanent alterations are introduced in the organization of the glassy matrix by the partial depressurization conditioning process. Unlike the rubbery material, the glassy polymer does not appear to reapproach its former permeation properties until the conditioning agent has been completely removed. The effects of the partial depressurization conditioning treatment on mixed gas permselectivity are consistent with a general dilation of the matrix. The permeability of $CO_2$ was increased by roughly 50% for a 50/50 $CO_2$/$CH_4$ mixture at 1000 psia after conditioning with pure $CO_2$ at 900 psia. On the other hand, the permeability of $CH_4$ was increased even more compared to its unconditioned value, so the effective permselectivity dropped by about 30% due to the partial depressurization conditioning process.

What is claimed is:

1. A process for conditioning a glassy-type polymeric gas permeable membrane to improve the flux of a gas penetrant therethrough, the process comprising the steps of:
    (a) swelling the membrane by dissolving therein a gaseous conditioning agent to a level that will plasticize the membrane without plasticizing the polymer to a rubbery state;
    (b) maintaining the membrane in a plasticized state for a period of time sufficient to stabilize the gas flux characteristics of the membrane; and
    (c) reducing the amount of dissolved conditioning agent in the stabilized membrane to a level that will maintain the membrane in the conditioned state pending use.

2. A process according to claim 1 wherein the conditioning agent is dissolved in the membrane to a sorption level of between about 0.1 and about 1.0 mmoles of the conditioning agent for every cubic centimeter of the membrane.

3. A process according to claim 1 wherein the conditioning agent is dissolved in the membrane to a sorption level of between about 0.2 and about 0.4 mmoles of the conditioning agent for every cubic centimeter of the membrane.

4. A process according to claim 1 wherein the conditioning agent is dissolved in the membrane to a sorption level of approximately 0.4 mmoles of the conditioning agent for every cubic centimeter of the membrane.

5. A process according to claim 1 wherein the conditioning agent comprises a gas having a boiling point of between about 90° and about 270° K.

6. A process according to claim 5 wherein the conditioning agent comprises $CO_2$, $C_2H_2$, $N_2O$, $SO_2$, $C_2H_6$, $C_2H_4$, $C_3H_8$, $C_3H_6$, $H_2S$, $CF_4$, $SF_6$, or $NH_3$.

7. A process according to claim 1 wherein the conditioning agent comprises a gas having a boiling point of between about 150° and about 270° K.

8. A process according to claim 7 wherein the conditioning agent comprises $CO_2$, $C_2H_4$, $C_2H_6$, $C_3H_8$, or $C_3H_6$.

9. A process according to claim 1 further comprising dissolving in the swelled membrane a flux maintaining agent, said agent being solubilized in the membrane to a sorption level that is sufficient to maintain the membrane in a conditioned state.

10. A process according to claim 9 wherein the flux maintaining agent is dissolved in the membrane at a level of at least 0.03 mmoles of the agent for every cubic centimeter of the membrane.

11. A process according to claim 9 wherein the flux maintaining agent comprises a gas, liquid or vapor.

12. A process according to claim 11 wherein the flux maintaining agent comprises a gas having a boiling point between about 60° and about 270° K.

13. A process according to claim 11 wherein the flux maintaining agent comprises a gas having a boiling point between about 100° and about 270° K.

14. A process according to claim 11 wherein the flux maintaining agent comprises $CO_2$, $C_2H_2$, $N_2O$, $SO_2$, $C_2H_6$, $C_2H_4$, $C_3H_8$, $C_3H_6$, $H_2S$, $CF_4$, $SF_6$, or $NH_3$.

15. A process according to claim 11 wherein the flux maintaining agent comprises $CO_2$, $CH_4$, $O_2$ or $N_2$.

16. A process according to claim 1 wherein the amount of dissolved conditioning agent is reduced to a level of no less than 0.03 mmoles of conditioning agent for every cubic centimeter of the membrane.

17. A process according to claim 1 wherein the membrane comprises a gas separating membrane.

18. A process according to claim 1 wherein the membrane comprises a contact lens, pervaporation or barrier membrane.

19. A process according to claim 1 wherein the glassy-type polymeric membrane comprises a membrane formed of a homopolymer, heterochain polymer, polymer blend or copolymer which includes a polycarbonate, a polyester, a polyamide, a polyimide, a polysulfone aryl ether, a substituted acetylene, an alpha-substituted olefin or a modified cellulosic.

20. A membrane of the glassy polymeric type conditioned by a process according to claim 1.

21. The membrane of claim 20 further defined as a gas separating membrane.

22. The membrane of claim 20 further defined as a contact lens, pervaporation, or barrier membrane.

23. The membrane of claim 20 wherein the membrane is formed of a homopolymer, heterochain polymer, copolymer or heteropolymer which includes a polycarbonate, a polyester, a polyamide, a polyimide, a polysulfone aryl ether, a substituted acetylene, an alpha-substituted olefin or a modified cellulosic.

24. A process for conditioning a glassy-type polymeric membrane to improve the flux of a penetrant therethrough, the process comprising the steps of:
(a) swelling the membrane by dissolving therein between about 0.1 and about 1.0 mmoles of a conditioning gas for every cubic centimeter of the membrane, the gas having a boiling point of between about 90° and about 270° K; and
(b) maintaining the level of dissolved conditioning gas at between about 0.1 and about 1.0 mmoles of gas for every cubic centimeter of the membrane until the membrane obtains about a steady state level of permeability; and
(c) reducing the level of dissolved conditioning gas in the membrane to a level of at least 0.03 mmoles of conditioning gas for every cubic centimeter of the membrane pending use.

25. A process according to claim 1 or 24 wherein the membrane is maintained in a swelled state for at least 6 hours.

26. A process according to claim 1 or 24 wherein the membrane is maintained in a swelled state for at least 24 hours.

27. A process according to claim 1 or 24 wherein the membrane is maintained in a swelled state for at least 48

28. A process for enriching for a gas permeate from a mixture of gases comprising the steps of:
(a) selecting a gas separating membrane of the polymeric glassy type, the membrane having a upstream side and a downstream side;
(b) treating the membrane by a process according to claim 1 or 24;
(c) contacting the upstream side of the membrane with the mixture of gases under sufficient pressure to achieve a flux of gas across the membrane; and
(d) collecting the gas permeate from the downstream side of the membrane.

29. A process according to claim 28 wherein the permeate comprises a conditioning agent.

30. A process according to claim 28 wherein the permeate comprises a flux maintaining agent.

31. In a process for enriching for a gas permeate from a mixture of gases, which process includes subjecting a glassy-type polymeric gas separating membrane to a mixture of gases under sufficient pressure to achieve a flux of gas across the membrane and collecting the gas permeate, wherein the improvment comprises treating the membrane by a process according to claim 1 or 24.

* * * * *